Oct. 8, 1968    A. N. SWEENY    3,404,590
AXIALLY ADJUSTABLE TOOL SUPPORT
Filed Sept. 1, 1966    2 Sheets-Sheet 1
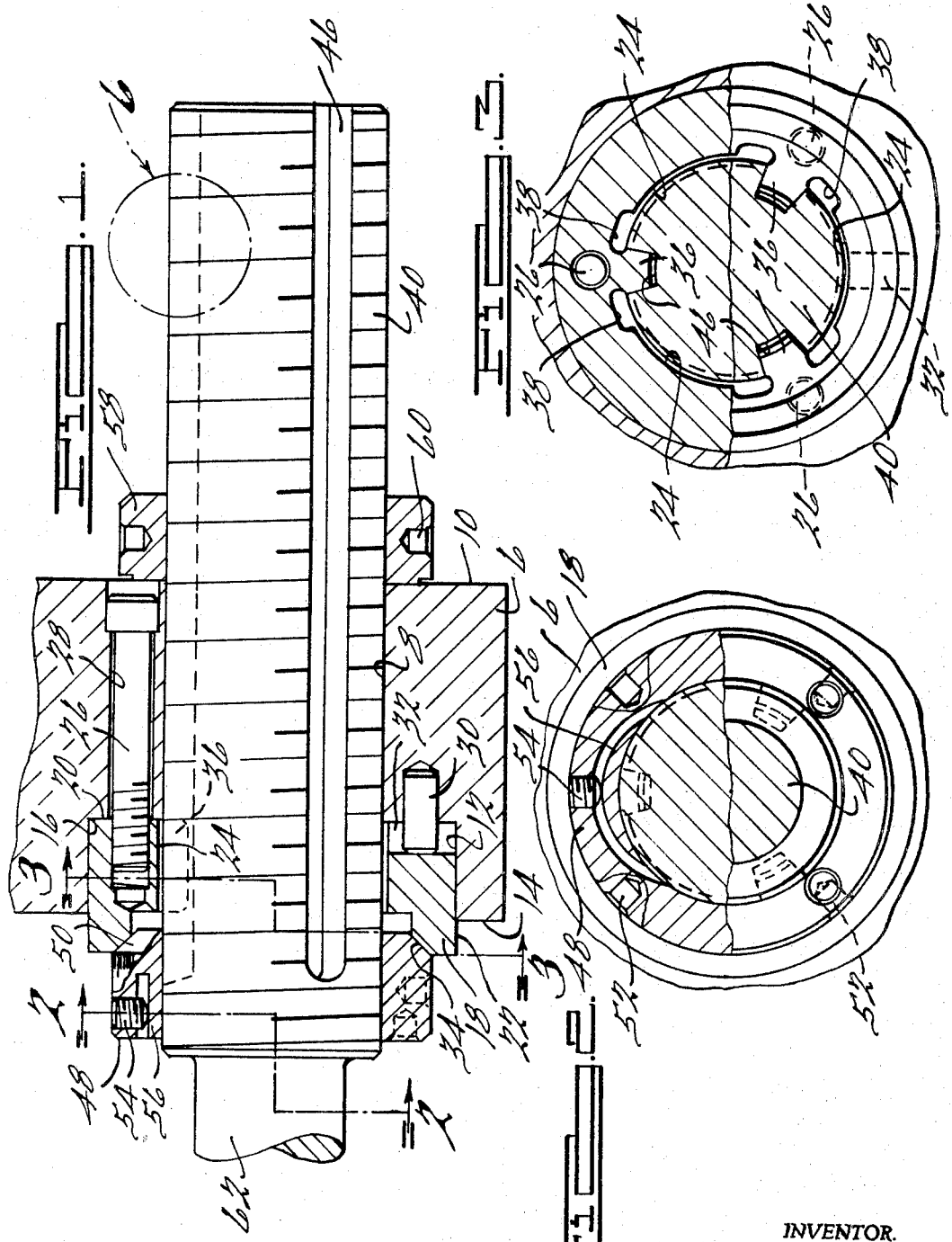
INVENTOR.
Allen N. Sweeny.
BY
Harness, Dickey & Pierce
ATTORNEYS.

Oct. 8, 1968  A. N. SWEENY  3,404,590
AXIALLY ADJUSTABLE TOOL SUPPORT
Filed Sept. 1, 1966  2 Sheets-Sheet 2
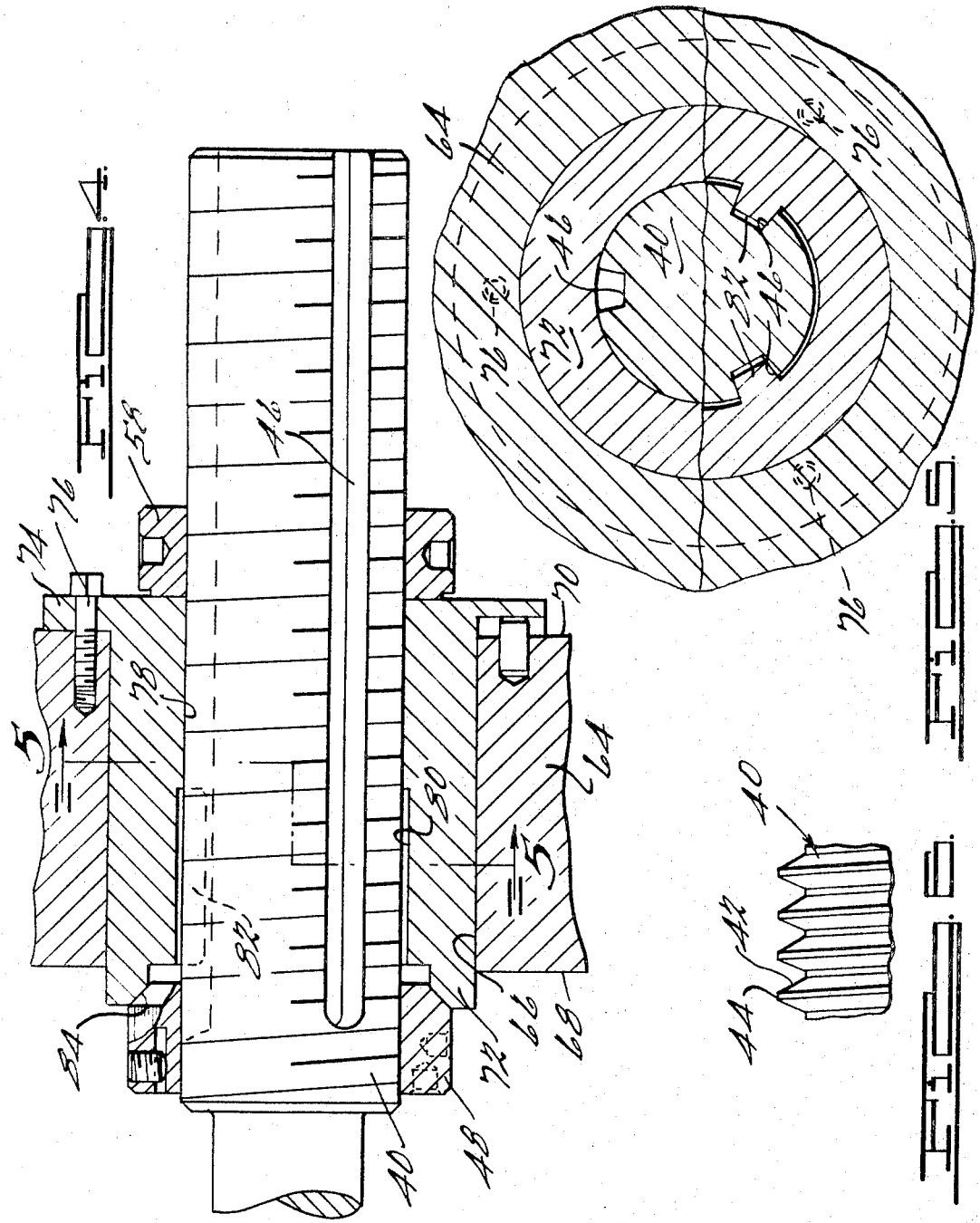
INVENTOR.
Allen N. Sweeny
BY
Harness, Dickey & Pierce
ATTORNEYS

United States Patent Office 3,404,590
Patented Oct. 8, 1968

3,404,590
AXIALLY ADJUSTABLE TOOL SUPPORT
Allen N. Sweeny, Grosse Pointe Farms, Mich., assignor to De Vlieg Machine Company, Royal Oak, Mich., a corporation of Michigan
Filed Sept. 1, 1966, Ser. No. 576,664
7 Claims. (Cl. 82—36)

This invention relates to cutting tools and particularly to an adjustable cutting tool mounting assembly.

It is an object of the present invention to provide an adjustable cutting tool mounting assembly which is capable of absorbing very large torques, and which is adapted for use on chucking machines, lathes, and a variety of other machine tools in which either the work or the tool is rotated with respect to the other.

It is another object of the present invention to provide a mounting assembly of the above character which may be manufactured relatively inexpensively yet to very accurate tolerances, which is convenient to use, and which possesses great structural strength and rigidity.

Still another object of the present invention is to provide a mounting assembly of the above character which may be rapidly and easily adjusted along a given axis, which may be preset to a given position of adjustment, and which may be conveniently embodied in a variety of different supporting members with minimal machining or modification of such supporting members.

These and other objects of the present invention will become apparent from the following detailed description taken in conjunction with the accompanying drawings, wherein:

FIGURE 1 is a view in longitudinal vertical cross section of a cutting tool mounting assembly embodying the principles of the present invention;

FIGS. 2 and 3 are sectional views of the structure illustrated in FIG. 1 taken along the lines 2—2 and 3—3 thereof, respectively;

FIG. 4 is a view of the structure similar to that illustrated in FIG. 1 showing a modified form of the present invention;

FIG. 5 is a sectional view of the structure illustrated in FIG. 4 taken along the line 5—5 thereof; and FIG. 6 is an enlarged detail view of the structure within the circle 6 of FIG. 1.

Referring now to the drawings and particularly to the embodiment of the invention illustrated in FIGS. 1 through 3, the tool mounting assembly is shown as being embodied in a supporting member 6. The supporting member 6 may assume the form of a turret hanger, multiple turning head, block, adapter, boring bar, or other member which is adapted to be held in a fixed position on a machine tool or secured in the drive spindle of the machine tool. In any case, the supporting member 6 will be seen to have a bore 8 which extends from an end wall 10 thereof, and is provided with a counterbore 12 adjacent an opposite end wall 14, parallel to the end wall 10. An annular shoulder 16, which extends radially relative to the axis of the bore 8, defines the bottom of a counterbore 12.

The counterbore 12 serves to receive a combined torque seating member 18, which is of generally annular configuration and has an annular radially extending end wall 20 flatly seated against the shoulder 16 of the counterbore 12. The member 18 has a cylindrical outer periphery 22 which is closely fitted within the counterbore and an inner periphery or opening 24 of a slightly greater diameter than the bore 8. The member 18 is secured in the counterbore by means of a plurality of fasteners such as cap screws 26 which have their heads positioned adjacent the end wall 10 and extend through openings 28 drilled in the member 6. A locating pin 30 is press fit into a hole of the member 6 and is received within a radial slot 32 formed in the bottom of the member 18. In the installation of the member 18 in the counterbore 12 the slot 32 must be aligned with the pin 30. This assures the correct angular orientation of the member 18 with respect to the counterbore 12. The pin 30 also assists in the transfer or torque between the member 6 and the member 18.

The combined torque and seat member 18 is distinguished by the provision of a conical seating surface 34 which is disposed adjacent its forward end and is of a greater diameter than the opening 24 and by the provision of a plurality of radially inwardly extending keys or splines 36 which project into the opening 24. In the embodiment of the invention illustrated herein, there are three keys 36 which are spaced equally about the circumference of the opening 24. The opening 24 is recessed as indicated at 38, on each side of each spline or key 36. It will be seen that the opening 24 is defined by a discontinuous cylindrical surface or wall which is interrupted by the recesses 38 and keys 36.

An externally threaded shank 40 is snugly fitted within the bore 8 of the supporting member 6 and projects entirely through the supporting member 6 as well as through the opening 24 of the member 18. As illustrated in FIG. 6 the shank 40 has an exterior thread 42 provided with a circular cylindrical crest 44. The crest 44 (which appears flat when seen in a cross sectional view of the thread) lies on a diameter adapted to snugly fit within the bore 8 in order to position the shank 40 with respect to the supporting member 6. The shank 40 has a plurality of equally circumferentially spaced axially extending keyways 46 machined in its outer periphery. The keyways 46 extend substantially the entire threaded length of the shank 40, and particularly for that portion of the shank 40 which lies within the combined torque and seat member 18. The keyways 46 serve to conformably receive and engage the keys or splines 36 formed on the member 18. As illustrated in FIG. 3, the sides of the keyways 46 engage the sides of the keys 36 while a clearance space exists between the wall of the opening 24 and the crest 44 of the thread 42. The keyways 46 are, of course, similar in number to the keys 36 and are equally spaced around the periphery of the shank 40.

A threaded adjusting collar 48 is threaded onto the shank 40 forwardly of the member 18 and is provided with a conical surface 50 conformably engaging the conical surface 34 of the member 18. A plurality of openings 52 are formed in the adjusting collar 48 for the reception of a spanner wrench, or the like. A set screw 54 threaded into the collar 48 may be tightened to deflect a portion 56 of the collar 48 and secure the collar 48 in a desired position on the shank 40. The adjusting collar 48 serves to maintain the forward end of the shank 40 coaxial with the bore 8 and it is held in an exact concentric position with respect to the bore 8 by means of member 18. Rotation of the adjusting collar 48 also serves to establish the position of the shank 40 along its longitudinal axis inasmuch as the keys 36 keep the shank 40 from rotating with the collar 48. The shank is, therefore, adjustable axially with respect to the member 18, but is positively held against rotation with respect to the member 18.

A locking member in the form of a nut 58 is threaded onto the shank 40 at the rear end thereof, and is engageable with the wall 10 in order to draw the adjusting collar 48 against the combined torque and seat member 18 and hold it in such position of engagement. The nut 58 will be seen to have openings 60 for the reception of a spanner wrench or the like, by means of which the nut 58 may be tightened and loosened.

The forward end of the shank 40 is shown at 62 as being broken away. This forward end 62 may be of any desired configuration and may carry any desired type of cutting tool as, for example, a single point cutting tool which is adjustable transversely of the longitudinal axis of the shank 40.

The provision of the seat 34 and the keys 36 on the same member 18 enables such portions of the member 18 to be made concentric to one another with great accuracy. This assures proper positioning of the shank 40 with respect to the member 18 and member 6 through the simultaneous engagement of the splines 36 with the keyways 46 and the engagement of the seating surface 34 with the conical surface 50. It should be noted that the formation of a plurality of keys poses definite problems which require an exactly machined concentric relationship between the keys 36 and the conical seat 34. This arrangement also assures extreme rigidity and strength enabling the mounting assembly to take extreme pressures and torques while it retains its ability to machine parts to highly accurate tolerances.

FIG. 4 illustrates another form of the present invention utilizing a supporting member 64 having a through bore 66 extending between an opposite pair of side walls 68 and 70 of the member 64. A combined torque and seat member 72 extends completely through the bore 66 and it has an annular flange 74 engaging the wall 70 and through which cap screws 76 are threaded into the member 64. The combined torque and seat member 72 has a bore 78 in which the shank 40 is closely fitted. Disposed forwardly of the bore 78 in the member 72 is an enlarged bore portion 80 which spacedly surrounds the threads of the shank 40. The member 72 is provided with a plurality of angularly spaced splines or keys 82 which extend radially into the bore portion 80 and are received within the keyways 46 of the shank 40. It will be noted that the keys 82 are located forwardly of the bore 78. A conical seat 84 is provided on the member 72 forwardly and radially outwardly of the keys 82. The seat 84 is engaged by the adjusting collar 48. The primary distinction of the embodiment illustrated in FIG. 4 is that the combined torque and seat member 72 also defines the cylindrical bore in which the shank 40 is piloted. Accordingly, very little machining has to be done in the member 64 and if the member 64 is made from cast iron or other soft material, a combined torque and seat member 72, made from steel or other hard material, may be inserted in the bore 66 and all of the critical machining may be accomplished on the member 72. The embodiment of FIG. 4 also uses the locking member 58 for holding the shank 40 with its adjusting collar 48 in engagement with the seat 84 of member 72.

One of the advantageous features of both embodiments of the invention is that the inner periphery of the combined torque and seat member and its splines may be formed by means of a broach which produces highly accurate results at a minimal machining cost. The broach may be exactly positioned with respect to the tooling used to machine the seat 34, thereby assuming the desired concentricity.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. An adjustable cutting tool mounting assembly including a supporting member, a combined torque and seat member fastened to said supporting member, said combined torque and seat member having a conical seating surface, a central opening and a plurality of integral keys extending radially inwardly into said opening, a threaded shank extending through said opening, an annular adjusting collar threaded on said shank and having a conical surface engageable with said seating surface, said shank having a plurality of axially extending keyways conformably engageable with said keys to prevent rotation of said shank relative to said supporting member and a locking member for drawing said collar against said seating surface.

2. The structure set forth in claim 1 in which one of said members is provided with a bore coaxial with said seating surface and in which said shank is closely fitted in said bore to hold said shank coaxial with said seating surface.

3. The structure set forth in claim 2 in which the thread of said shank is provided with a crest lying on a circular cylindrical surface and in which said crest conformably engages the wall of said bore.

4. The structure set forth in claim 1 in which said keys and keyways are equiangularly spaced.

5. The structure set forth in claim 1 in which said locking member comprises a nut threaded on the same thread of said shank as said adjusting collar.

6. The structure set forth in claim 2 in which said bore is formed in said supporting member and an annular clearance space exists in said opening around said shank.

7. The structure set forth in claim 2 in which said bore is formed in said combined torque and seat member, in which said opening is defined by a counterbore and in which said combined torque and seat member has a flange operable to receive fasteners threadably securing said combined torque and seat member to said supporting member.

References Cited

" 'Microbore' By De Vlieg," Catalog # 56, p. 4, FIG. 10, copyright 1956, copy in Gr. 325.

LEONIDAS VLACHOS, *Primary Examiner.*